Nov. 6, 1951   J. B. SMITH ET AL   2,574,440
HEATED KNIFE
Filed July 1, 1949

INVENTORS
James B. Smith
James Q. Sidwell
BY Ralph B. Stewart
ATTORNEY

Patented Nov. 6, 1951

2,574,440

UNITED STATES PATENT OFFICE 2,574,440

HEATED KNIFE

James B. Smith and James Q. Sidwell,
Murfreesboro, Tenn.

Application July 1, 1949, Serial No. 102,657

6 Claims. (Cl. 219—29)

This invention relates to a heated knife to be used in cutting and laying linoleum and asphalt tile.

A primary object of the invention is to provide a knife which will reduce the amount of labor and skill required to cut linoleum accurately.

Another object of the invention is to provide a knife which requires less pressure to cut linoleum.

Another object is to provide a knife which may be used to produce invisible seams in linoleum.

Yet another object is to provide a knife with which asphalt tile may be cut without preliminary heating of the tile with a blow torch.

A further object is to provide a heated knife having a heat shield between the heating element and the handle to prevent burning of the handle or the operator's hand.

Another object is to devise a knife in which the heated cutting blade may be replaced easily and in which the heating element may be replaced easily.

Still another object is to provide a heated knife that may be operated entirely by one hand.

A preferred form of the invention is shown in the accompanying drawings in which.

Figure 1:
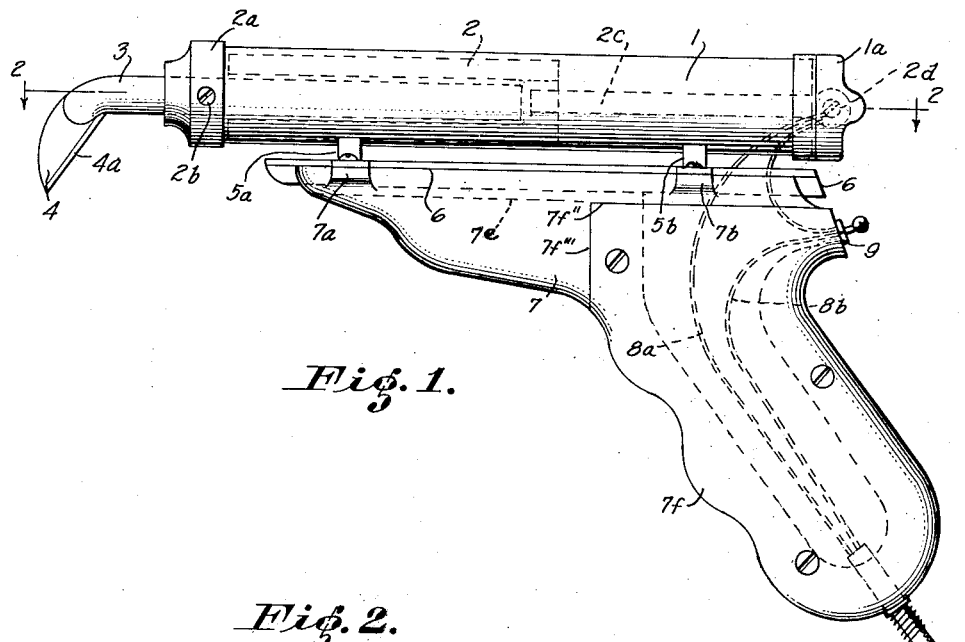
Figure 1 is a side elevational view of the heated knife.

A tubular casing 1, closed at one end by a removable cap 1a, encloses a tubular heating unit 2 within the other end portion. Rigidly secured to the end of casing 1 adjacent heater 2 is a collar 2a that has a set-screw 2b threaded transversely thereof. A heat-conducting rod or bar 3, preferably formed of copper, and having the cutting blade 4 mounted on one end thereof, extends through collar 2a into the tubular heating element 2 and is held in place by the set-screw 2b. By this arrangement, the cutting blade 4 and its heat-absorbing stem 3 may be removed from the knife structure without disturbing the heating unit or other parts. It will be understood that each knife may be provided with a number of cutting blades of different shapes, each being equipped with a heat-absorbing stem of the proper size to fit into the opening in collar 2a. The cutting edge of the blade is shown at 4a.

Extending to the rear of heating unit 2 is an insulating member 2c which has terminals 2d and 2e mounted thereon at the rear of the casing 1 and within the removable cap 1a. Heating coil leads 2f and 2g are attached to these terminals, and cap 1a, when removed, provides access to the terminals in order to complete the connection to power leads 8a and 8b. Preferably, terminal member 2c is mounted on the end of the heating coil so that the coil and terminal support may be inserted or removed through the rear end of the casing as a unit.

Attached to the tubular casing 1 at spaced points along its length are curved spacer blocks 5a and 5b; attached to the other side of spacer blocks 5a and 5b is heat shield 6 which is also curved to conform generally to the curvature of the tubular casing. This heat shield 6 has ears 6a, 6b, 6c and 6d formed thereon for the purpose of attaching the shield and tubular casing to a handle 7, and an aperture 6e is formed in the heat shield in the rearward portion to allow the electrical leads 8a and 8b to pass from the handle 7 to the terminals 2d and 2e of heating element 2. Tubular casing 1 has a similar aperture formed therein in alignment with aperture 6e. The handle 7 is of the pistol-grip type and has lugs 7a, 7b, 7c and 7d disposed on both sides of an arcuate groove formed in the upper edge of the base portion of the handle and of somewhat larger radius than the tubular casing 1 or the heat shield 6. The ears 6a, 6b, 6c, 6d rest on these lugs and are fastened thereto by machine screws that are threaded into the lugs. The heat shield may be formed of metal, either with or without an additional layer of heat-insulating material such as asbestos. The construction illustrated provides for circulation of air on both sides of the heat shield which results in rapid dissipation of heat and the ears 6a, 6b, 6c and 6d do not become sufficiently hot to scorch the handle 7 even if there is no layer of insulating material.

The handle 7 may be formed of wood or plastic and preferably is hollow so that an electric cord may enter at the bottom of the grip portion and pass up through the interior. A portion of the handle 7f is removable to provide access to the wiring in the interior of the handle, the dividing planes for the removable part being indicated at 7f', 7f'' and 7f'''. Just below the arcuate groove 7e and on the rear of the handle is mounted a switch 9, where it may be operated by the thumb of the hand gripping the handle. This switch is connected in lead 8b which then continues on through the aperture 6e, to the terminal 2c.

Figure 2:
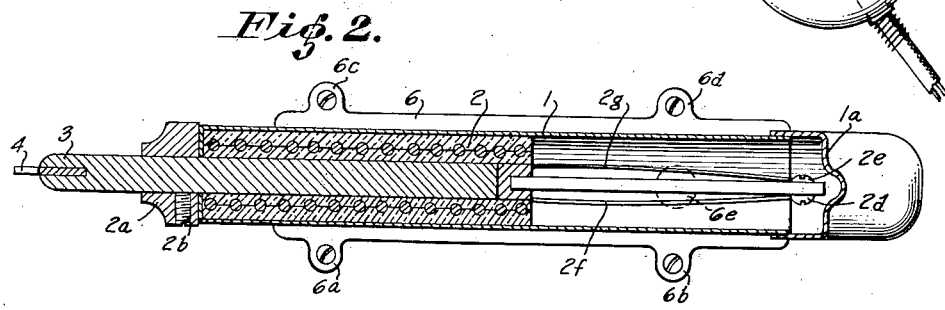
Figure 2 is a sectional view from the top along line 2—2 of Figure 1.
Figure 3:
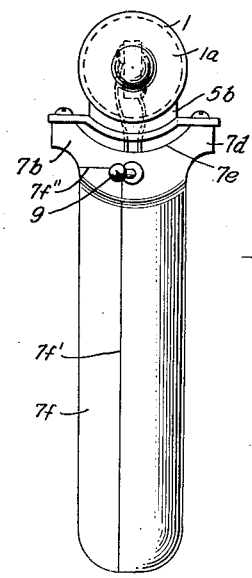
Figure 3 is an end elevational view from the right of Figure 1.

It will be seen that by the construction just described the heat shield serves both to mount the tubular casing 1 on the handle 7 and to protect the handle from being scorched by the heat given off by the heating element. This results in a rugged, simple assembly that is inexpensive to manufacture and is easily disassembled when necessary. The operator may easily turn the current on while picking the knife up with one hand and turn it off in a similar manner before laying the knife down. However, if the operator does not wish to turn the current off before laying the knife down, he will not have to be concerned about scorching the surface upon which he lays the knife as the lugs 7a, 7b, 7c and 7d will act to keep the hot portions of the knife away from the surface. Lug 7c is not visible in the drawing but is located below the ear 6c in Figure 2. The manner in which the knife blade 4 and the copper bar 3 to which it is attached are supported within the heating element 2 permits the interchange of a variety of shapes of blades for more efficient utilization of the knife. If desired, the rear portion of casing 1 may be perforated with ventilating holes to keep this part of the casing relatively cool.

Another advantage of the heated knife is that it may be used to form invisible seams in linoleum where two pieces are joined. To accomplish this result the seam is wetted with linseed oil and the hot knife blade worked over the seam.

The usual method of cutting asphalt tiles is to heat them with a blow-torch and then cut them with a regular knife. This method is time consuming and inconvenient, besides requiring the use of an extra tool, the blow torch. The heated knife herein disclosed will cut asphalt tile quickly and neatly with no preliminary operations and no extra tools.

What we claim is:

1. A heated knife for cutting linoleum comprising a tubular casing, a removable cap closing one end of said casing, a hollow, cylindrical heating element mounted within said casing at the other end thereof, a heat-conducting bar removably mounted within said heating element, a cutting blade mounted on one end of said bar outside of said casing, a plurality of spaced blocks mounted on said casing at spaced points thereon, a heat-shield mounted on said spacer blocks and having a plurality of ears formed along the edges thereof, a pistol-grip handle having an arcuate groove formed longitudinally along the upper edge thereof and a plurality of lugs formed on both sides of said groove, and means securing the ears of said heat shield to said lugs for supporting said casing on said handle.

2. A heated knife according to claim 1 and including a switch mounted on said handle below said arcuate groove and connected in the circuit of said heating element.

3. A heated knife according to claim 1 wherein said lugs project outwardly beyond said body member and the sides of said handle whereby said body member is prevented from coming in contact with any surface upon which said knife is laid.

4. A heated knife for cutting linoleum comprising a tubular casing, a hollow, cylindrical heating element mounted within said casing at one end thereof, a heat-conducting bar removably mounted within said heating element and having one end thereof extending out of said heating element and out of said casing, a cutting blade on said one end of said bar outside of said casing, a plate-like heat shield arranged parallel with said casing and extending substantially throughout the length of said casing, means supporting said casing upon said shield in spaced relation to provide an air space between said casing and said shield, a pistol-grip handle having a base portion and an angularly disposed gripping portion, and means for mounting said shield upon said base portion in parallel superposed relation with said base portion and spaced above the upper edge of said base portion to provide an air space between said shield and said handle.

5. A heated knife according to claim 1 wherein said handle is hollow and said heat-shield has an aperture formed therein and including an electrical switch mounted on the rear of said handle and an electrical cord entering said handle at the lower end of the grip portion thereof and passing from said switch through said aperture to said heating element.

6. A heated knife according to claim 1 wherein said heating element has incorporated therein a terminal support which extends to the rear of said casing into said cap, and a pair of terminals for said heating element mounted on said support within said cap, whereby said removable cap provides access to the terminals carried by said terminal support.

JAMES B. SMITH.
JAMES Q. SIDWELL.

REFERENCES CITED

The following references are of record in the file of this patent:

UNITED STATES PATENTS

| Number | Name | Date |
| --- | --- | --- |
| 2,051,684 | Dick | Aug. 18, 1936 |

FOREIGN PATENTS

| Number | Country | Date |
| --- | --- | --- |
| 268,631 | Great Britain | Apr. 7, 1927 |